US010582446B2

(12) United States Patent
Johansson et al.

(10) Patent No.: US 10,582,446 B2
(45) Date of Patent: Mar. 3, 2020

(54) SUPPORT OF MOBILE STATION ASSISTED DEDICATED CORE NETWORK SELECTION

(71) Applicant: TELEFONAKTIEBOLAGET LM ERICSSON (PUBL), Stockholm (SE)

(72) Inventors: Nicklas Johansson, Brokind (SE); John Walter Diachina, Garner, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/977,356

(22) Filed: May 11, 2018

(65) Prior Publication Data

US 2018/0332528 A1 Nov. 15, 2018

Related U.S. Application Data

(60) Provisional application No. 62/505,035, filed on May 11, 2017.

(51) Int. Cl.
*H04W 48/18* (2009.01)
*H04W 88/08* (2009.01)

(52) U.S. Cl.
CPC ............ *H04W 48/18* (2013.01); *H04W 88/08* (2013.01)

(58) Field of Classification Search
CPC ..... H04W 8/005; H04W 8/065; H04W 48/12; H04W 48/18; H04W 48/20; H04W 88/08
See application file for complete search history.

(56) References Cited

U.S. PATENT DOCUMENTS

| | | | | |
|---|---|---|---|---|
| 2014/0036685 A1* | 2/2014 | Kim | ...................... | H04W 48/20 370/236 |
| 2018/0279174 A1* | 9/2018 | Yannick | ................ | H04W 8/065 |

FOREIGN PATENT DOCUMENTS

| | | |
|---|---|---|
| EP | 1206890 A1 | 5/2002 |
| WO | 2017061111 A1 | 4/2017 |

OTHER PUBLICATIONS

3GPP TS 23.401 V14.3.0 (Mar. 2017), 3rd Generation Partnership Project; Technical Specification Group Services and System Aspects; General Packet Radio Service (GPRS) enhancements for Evolved Universal Terrestrial Radio Access Network (E-UTRAN) access, (Release 14), Mar. 16, 2017, the whole document.

(Continued)

*Primary Examiner* — Khoa Huynh

(57) ABSTRACT

A Radio Access Network (RAN) node (e.g., BSS) and method are described herein that introduce one or more bits in any of the current system information (SI) messages or in a new SI message to ensure that a wireless device upon receipt of the SI message knows if a cell supports a Mobile Station Assisted Dedicated Core Network Selection such that the wireless device can transmit uplink Radio Link Control (RLC)/Media Access Control (MAC) radio blocks that will match the capability of the RAN node (e.g., BSS). In addition, the present disclosure relates to the wireless device and method for receiving a SI message from the RAN node (e.g., BSS) that indicates if a cell supports the Mobile Station Assisted Dedicated Core Network Selection such that the wireless device can transmit uplink RLC/MAC radio blocks that will match the capability of the RAN node (e.g., BSS).

12 Claims, 19 Drawing Sheets

(56) References Cited

OTHER PUBLICATIONS

3GPP TS 44.018 V14.1.0 (Mar. 2017), 3rd Generation Partnership Project; Technical Specification Group Radio Access Network; Mobile radio interface layer 3 specification; GSM/EDGE Radio Resource Control (RRC) protocol, (Release 14), Mar. 20, 2017, the whole document.

* cited by examiner

SI 13 MESSAGE:
200

204

**TABLE 10.5.2.37b.1: *SI 13 REST OCTETS* INFORMATION ELEMENT CONTENT**

```
< SI 13 Rest Octets > ::=
	{ L | H
		< BCCH_CHANGE_MARK : bit (3) >
		< SI_CHANGE_FIELD : bit (4) >

		{ 0 | 1  < SI13_CHANGE_MARK : bit (2) >
				< GPRS Mobile Allocation : GPRS Mobile Allocation IE > }	--
Defined in 3GPP TS 44.060

				{ 0			-- PBCCH not present in cell (This shall
always be indicated. See sub-clause 1.8) :
			< RAC : bit (8) >
			< SPGC_CCCH_SUP : bit >
			< PRIORITY_ACCESS_THR : bit (3) >
			< NETWORK_CONTROL_ORDER : bit (2) >
			< GPRS Cell Options : GPRS Cell Options IE >
		-- Defined in 3GPP TS 44.060
			< GPRS Power Control Parameters : GPRS Power Control Parameters IE >

				| 1			-- PBCCH present in cell (This shall
never be indicated. See sub-clause 1.8) :
			< PSI1_REPEAT_PERIOD : bit (4) >
			< PBCCH Description : PBCCH Description struct >
		}
		{ null | L	-- Receiver compatible with earlier release
			| H		-- Additions in release 99 :
			< SGSNR : bit >

			{ null | L	-- Receiver compatible with earlier release
				| H		-- Additions in release Rel-4:
				< SI_STATUS_IND : bit >

				{ null | L	-- Receiver compatible with earlier release
```

FROM FIG. 2A

```
                        | H                 -- Additions in release Rel-6:
                  { 0     | 1      < LB_MS_TXPWR_MAX_CCH : bit (5) > }
                  < SI2n_SUPPORT : bit(2) >
                        {
                              -- Additions in release Rel-11:
                              <  SI_CHANGE_ALT >
                              -- Additions in release Rel-13:
                              { 0 | 1 < PEO_DSC : bit (2) >
                                        <  RCC : bit (3) > }
                              { 0 | 1 < C1_DELTA_MIN  : bit (2) >
                                        <  C1_DELTA_MAX : bit (3) > }
                              -- Additions in release Rel-14:
                              <  MS_ASSISTED_DCN : bit >  202
                              -- Additions in future releases shall be indicated above
this line
                        } //       -- truncation according to sub-clause 8.9 is
allowed, bits "L" assumed

                  }
               }
           }
      }
      < spare padding > ;
< PBCCH Description struct > ::=
      < Pb : bit (4) >
      < TSC : bit (3) >
      < TN : bit (3) >
            {     00          -- BCCH carrier
          | 01    < ARFCN : bit (10) >
          | 1           < MAIO : bit (6) > } ;
 < SI_CHANGE_ALT > ::=  L | H ;
```

FIG. 2B

SI 13 MESSAGE:
200

Table 10.5.2.37b.2: *SI 13 REST OCTETS* INFORMATION ELEMENT

BCCH_CHANGE_MARK (3 bit field)
This field indicates the status of the information on BCCH. The value of this field may be changed when information on BCCH is changed, see 3GPP TS 44.060.

SI_CHANGE_FIELD (4 bit field)
This field is the binary representation of which information was changed at the last indication in BCCH_CHANGE_MARK, see 3GPP TS 44.060. Range 0 to 15:

0 Update of *unspecified* SI message or SI messages;
1 Update of SI1 message;
2 Update of SI2, SI2 bis or SI2 ter message or any instance of SI2quater messages;
3 Update of SI3, SI4, SI7, SI8, SI16 or SI17 message;
4 Update of SI9 message;
5 Update of SI18 or SI20 message;
6 Update of SI19 message;
7 Update of SI15 message;
8 Update of SI2n message;
9 Update of SI22 or SI23 message;
All other values shall be interpreted as 'update of unknown SI message type'.

SI13_CHANGE_MARK (2 bit field)
This field is the binary representation of the SI change mark identifying the GPRS Mobile Allocation provided in SI13 and PSI13 messages. Range: 0 to 3.

GPRS Mobile Allocation (information element)
This information element is the representation of the GPRS mobile allocation provided in SI13 and PSI13 messages. It is identified by MA_NUMBER = 14 when referenced from a packet assignment message. The *GPRS Mobile Allocation* information element is defined in 3GPP TS 44.060. When used in SI13 or PSI13 message, this information element shall refer to the cell allocation defined for the cell in SI1 or PSI2.

RAC (8 bit field)
This field is the binary representation of the Routing Area Code, see 3GPP TS 23.003.

SPGC_CCCH_SUP (bit field)
This field indicates the support of the parameter SPLIT_PG_CYCLE on CCCH from the network side:

0 SPLIT_PG_CYCLE is not supported on CCCH in this cell;
1 SPLIT_PG_CYCLE is supported on CCCH in this cell.

The PRIORITY_ACCESS_THR field (3 bit) is the binary representation of the parameter PRIORITY_ACCESS_THR:

0 0 0 packet access is not allowed in the cell;
0 0 1 spare, shall be interpreted as '000' (packet access not allowed);
0 1 0 spare, shall be interpreted as '000' (packet access not allowed);
0 1 1 packet access is allowed for priority level 1;

FROM FIG. 3A 1 0 0 packet access is allowed for priority level 1 to 2;
1 0 1 packet access is allowed for priority level 1 to 3;
1 1 0 packet access is allowed for priority level 1 to 4;
1 1 1 spare, shall be interpreted as '110' (packet access allowed).

The NETWORK_CONTROL_ORDER field (2 bit) is the binary representation of the parameter NETWORK_CONTROL_ORDER, see 3GPP TS 44.060:

0 0 NC0: MS controlled cell re-selection, no measurement reporting.
0 1 NC1: MS controlled cell re-selection, MS sends measurement reports.
1 0 NC2: Network controlled cell re-selection, MS sends measurement reports.
1 1 Reserved for future use, interpreted as NC0 by mobile station.

GPRS Cell Options (information element)

The *GPRS Cell Option* information element is defined in 3GPP TS 44.060.

PSI1_REPEAT_PERIOD (4 bit field)

This field is the representation of the PSI1 repeat period. The field is coded according to the following table:

0000 PSI1 repeat period = 1 multiframe
0001 PSI1 repeat period = 2 multiframes
:
1111 PSI1 repeat period = 16 multiframes

GPRS Power Control Parameters

The *GPRS Power Control Parameters* information element is defined in 3GPP TS 44.060.

PBCCH Description struct

The PBCCH description struct provides the channel description for the PBCCH. The frequency description for the PBCCH may be specified by an ARFCN (non-hopping radio frequency channel) or a MAIO (hopping radio frequency channel) field. In case of a hopping radio frequency channel, the PBCCH shall use the GPRS mobile allocation specified in this message. If none of the ARFCN or MAIO fields are present, the PBCCH shall use the BCCH carrier.

Pb (4bit) (for encoding and description see the Global Power Control Parameters IE)

The TSC field (3 bit) is the binary representation of the training sequence code used for PBCCH. Range: 0 to 7.

The TN field (3 bit) is the binary representation of the timeslot number for the PBCCH. Range: 0 to 7.

The ARFCN field (10 bit) is the binary representation of the absolute RF channel number. Range: 0 to 1023.

The MAIO field (6 bit) is the binary representation of the mobile allocation index offset. Range: 0 to 63.

SGSNR, SGSN Release (1 bit field)

0 SGSN is Release '98 or older
1 SGSN is Release '99 onwards

FROM FIG. 3B

SI_STATUS_IND (1 bit field)
0 The network does not support the PACKET SI STATUS message;
1 The network supports the PACKET SI STATUS message.
LB_MS_TXPWR_MAX_CCH (5 bit field)
The LB_MS_TXPWR_MAX_CCH field is coded as the binary representation of the 'power control level' in 3GPP TS 45.005 corresponding to the maximum TX power level a mobile station may use when accessing on a packet control channel. This value shall be used by the mobile station according to 3GPP TS 45.008.
SI2n_SUPPORT (2 bit field)
The SI2n_SUPPORT field indicates whether the network supports the SI2n message provision.
00 SI2n is not supported
01 SI2n is supported on PACCH
10 SI2n is supported on PACCH and broadcast on BCCH
11 SI2n is supported on PACCH and broadcast on BCCH Ext.
SI_CHANGE_ALT
This field indicates how a mobile station supporting network sharing shall take into account a change of system information signalled by a SI_CHANGE_FIELD value '2':
L A mobile station supporting network sharing should not attempt to re-read the SI2quater message;
H A mobile station supporting network sharing shall fully take into account a change of system information signalled by the SI_CHANGE_FIELD value '2', SI2quater included.
PEO_DSC (2 bit field)
This field provides an intial value for the downlink signalling counter (DSC) used for verifying the ongoing ability of a MS that has enabled eDRX to receive paging messages on the PCH (3GPP TS 45.008). The presence of the PEO_DSC field indicates the serving cell supports PEO.
The PEO_DSC field is coded according to the following table:

| | |
|---|---|
| 00 | DSC = 4 |
| 01 | DSC = 6 |
| 10 | DSC = 8 |
| 11 | DSC = 10 |

RCC (3 bit)
See sub-clause 10.5.2.16.

C1_DELTA_MIN (2 bit field)
See sub-clause 9.1.43r.
C1_DELTA_MAX (3 bit field)
See sub-clause 9.1.43r.
MS_ASSISTED_DCN
This field indicates if the cell supports MS assisted Dedicated Core Network selection, see 3GPP TS 23.401 [110].
0 The network does not support MS assisted Dedicated Core Network selection;
1 The network supports MS assisted Dedicated Core Network selection.
All remaining bit positions are reserved.

202

NOTE: THE SGSN RELEASE BIT INDICATES THE VERSION OF THE SGSN SPECIFIC PROTOCOLS AND IS NOT APPLICABLE TO ACCESS STRATUM PROTOCOLS.

EC-SI2
400

Figure 9.1.43q.1: EC SYSTEM INFORMATION TYPE 2 MESSAGE CONTENT

```
Direction: network to mobile station< EC System Information Type 2 > ::=
    < Message Type : bit (3) >
    < EC SI 2_INDEX : bit (2) >
    < EC SI 2_COUNT : bit (2) >
    < EC SI_CHANGE_MARK : bit (5) >

    { 0 | 1 < EC Cell Selection Parameters : < EC Cell Selection Parameters struct >> }
    { 0 | 1 < Coverage Class Selection Parameters : < Coverage Class Selection Parameters struct >> }
    { 0 | 1 < EC-RACH Control Parameters : < EC-RACH Control Parameters struct >> }
    { 0 | 1 <Short RACH Control Parameters : < Short RACH Control Parameters struct >> }
    { 0 | 1 <EC Cell Options : < EC Cell Options struct >> }
    -- Additions in release Rel-14:
    < MS_ASSISTED_DCN : bit >  202
    < spare padding > ;

< EC Cell Selection Parameters struct > ::=
    < Location Area Identification : bit (40) >
    < Routing Area Code : bit (8) >
    < Cell Identity : bit (16) >
    < EC_BS_CC_CHANS : bit (2) >
    < EC_RXLEV_ACCESS_MIN : bit (6) >    --used in the path loss criterion C1
    < MS_TXPWR_MAX_CCH : bit (5) >       --used in the path loss criterion C1
    { 0 | 1    < LB_MS_TXPWR_MAX_CCH : bit (5) > }
    { 0 | 1    < CELL_SELECTION_RLA_MARGIN : bit (3) > };

< Coverage Class Selection Parameters struct > ::=
    < DL_CC_Selection : bit (1) >
    < BT_Threshold_DL : bit (5) >
    { 0 | 1    < CC2_Range_DL : bit (5) > }
    { 0 | 1    < CC3_Range_DL : bit (5) > }
    < BT_Threshold_UL : bit (5) >
    { 0 | 1    < CC2_Range_UL : bit (5) > }
    { 0 | 1    < CC3_Range_UL : bit (5) > }
    < BSPWR : bit (6) >
    { 0 | 1 < DL_Signal_Strength_Step_Size : bit (2) > }
```

FROM FIG. 4A

```
        < EC_Reduced_PDCH_Allocation  : bit(1) >;

< EC-RACH Control Parameters struct > ::=
        < EC_Max_Retrans : bit (2) >
        < Sm: bit (2) >
        < Tm: bit (2) >
        < Access_Timeslots: bit (1) >
        < CC_Access_Adaptation: bit (2) >
        < Cell_Bar_Access : bit (1) >
        < EC_Access_Control_Class: bit (7) >
        < Exception_Report_Status : bit (1) >
        { 0 | 1 < BT_Threshold_UL_Margin : bit (3) > } ;

< Short RACH Control Parameters struct > ::=
        < Max_Retrans: bit (2) >
        < Tx-integer : bit (4) >
        < Cell_Bar_Access: bit (1) >
        { 0        --      Access Control Class information and Exception Report Status in EC-RACH Control
Parameters applies
              | 1          -- The indicated Access Control Class bitmap and Exception Report Status field applies
                           < Access _ Control_Class : bit (16) >
                           < Exception_Report_Status  : bit (1) >
         } ;

< EC Cell Options struct > ::=
       { 0 | 1       < ALPHA : bit (4) > }
       { 0 | 1       < T3168 : bit (3) > }
       { 0 | 1       < T3192 : bit (3) > }
       { 0 | 1       < T3226 : bit (3) > }
        < T3248: bit (2) > ;
```

Table 9.1.43q.1: EC SYSTEM INFORMATION TYPE 2 INFORMATION ELEMENT DETAILS

Message Type (3 bits)
The Message Type field is encoded according to Table 10.4.4.

EC SI 2_INDEX (2 bits) and EC SI 2_COUNT (2 bits)
The purpose of these fields is to indicate the number of individual message instances within the sequence of EC SI 2 messages and to assign an index to identify each instance. The EC SI 2_INDEX field is binary coded, range 0 to 3, and provides an index to identify an individual EC SI 2 message instance. The EC SI 2_COUNT field is binary coded, range 0 to 3, and provides the value of the highest indexed message instance in the sequence of EC SI 2 messages.

EC SI_CHANGE_MARK (5 bits)
This field is defined in Table 9.1.43p.1.

EC Cell Selection Parameters struct
This structure provides the cell selection parameters for the serving cell.
Location Area Identification (40 bits)
The Location Area Identification field is coded as the value part of the Location Area Identification IE specified in sub-clause 10.5.1.3.

Routing Area Code (8 bits)
This field is the binary representation of the Routing Area Code, see 3GPP TS 23.003.

Cell Identity (16 bits)
The Cell Identity field is coded as the value part of the Cell Identity IE specified in sub-clause 10.5.1.1.

EC_BS_CC_CHANS (2 bits)
This field indicates the number of extended coverage common control channels (EC-CCCHs) supported in the cell.

| Value | |
|---|---|
| 00 | 1 EC-CCCH supported |
| 01 | 2 EC-CCCHs supported |
| 10 | 3 EC-CCCHs supported |
| 11 | 4 EC-CCCHs supported |

If the Access_Timeslots field provided in this message indicates that 2 TS EC-RACH mapping shall be applied in the cell, then the number of EC-CCCHs supported in the cell shall be equal to or lower than the number of common control channels (CCCHs) configured in the same cell.

EC_RXLEV_ACCESS_MIN (6 bits)
The EC_RXLEV_ACCESS_MIN field is coded as the binary representation of the minimum received signal level at the MS for which it is permitted to access the system, see 3GPP TS 45.008.

FROM FIG. 5A

MS_TXPWR_MAX_CCH (5 bits)
The MS_TXPWR_MAX_CCH field is coded as the binary representation of the "power control level" in 3GPP TS 45.005 corresponding to the maximum TX power level an MS may use when accessing the system on the (EC-)CCCH. This value shall be used by the Mobile Station according to 3GPP TS 45.008.

LB_MS_TXPWR_MAX_CCH (5 bits)
The LB_MS_TXPWR_MAX_CCH field is coded as the binary representation of the "power control level" in 3GPP TS 45.005 corresponding to the maximum TX power level an MS may use on all other than DCS 1800 and PCS 1900 frequency bands when accessing the system on the (EC-)CCCH. This value shall be used by the Mobile Station according to 3GPP TS 45.008.

CELL_SELECTION_RLA_MARGIN (3 bits)
The CELL_SELECTION_RLA_MARGIN field provides the MS with information whether RLA_EC and RLA_GC based measurements may be omitted or not. The use of this field is defined in 3GPP TS 45.008.

Coverage Class Selection Parameters struct
This structure provides information for the MS to estimate its uplink and downlink coverage class.

DL_CC_Selection (1 bit)
This field indicates the method for selecting the downlink coverage class to be used by the MS.

| Bit | |
|---|---|
| 0 | RLA_EC based coverage class selection |
| 1 | SLA based coverage class selection |

The use of this field is defined in 3GPP TS 45.008.

BT_Threshold_DL (5 bits)
This field indicates the threshold below which blind physical layer transmissions are used on EC-CCCH. The use of this field is defined in 3GPP TS 45.008.

CC2_Range_DL (5 bits)
CC3_Range_DL (5 bits)
These fields are optionally sent by the network to indicate the signal level range of the indicated downlink coverage classes. The presence of one or both of the above fields indicates network support of the associated downlink coverage class.
The use of these fields is defined in 3GPP TS 45.008.

BT_Threshold_UL (5 bits)
This field indicates the signal level threshold below which blind physical layer transmissions are used on EC-RACH. The use of this field is defined in 3GPP TS 45.008.

FROM FIG. 5B

CC2_Range_UL (5 bits)
CC3_Range_UL (5 bits)
These fields are optionally sent by the network to indicate the signal level range of the indicated uplink coverage classes. The presence of one or both of the above fields indicates network support of the associated uplink coverage class.
The use of these fields is defined in 3GPP TS 45.008.

BSPWR (6 bits)
This field indicates the BTS output power transmitted on FCCH and EC-SCH.
The use of this field is defined in 3GPP TS 45.008.

DL_Signal_Strength_Step_Size (2 bits)
This field indicates the step-size in signal level above BT_Threshold_DL possible to report by the MS in the EC Packet Channel Request message (see sub-clause 9.1.65). It is encoded as follows:

| Bits 2 1 | |
|---|---|
| 0 0 | X = 2 |
| 0 1 | X = 4 |
| 1 0 | X = 6 |
| 1 1 | X = 8 |

EC_Reduced_PDCH_Allocation (1 bit)
This field indicates that the number of consecutive PDCHs the network allocates when assigning an EC TBF to a MS indicating Coverage Class CC2, CC3 or CC4 on the uplink or downlink during packet access.

| Bit | |
|---|---|
| 0 | Four consecutive PDCHs are always allocated to MS for an EC TBF. |
| 1 | Two consecutive PDCHs are always allocated to MS for an EC TBF. |

EC-RACH Control Parameters struct
The EC-RACH Control Parameters contains the access control parameters needed when accessing the network on the EC-RACH.
EC_Max_Retrans (2 bits)
This field indicates the maximum number of retransmissions on EC-RACH (see sub-clause 3.5.2.1.2a). It is encoded as the Max retrans field in the *RACH Control Parameters* IE defined in sub-clause 10.5.2.29.

Sm (2 bits)
This field is used by a MS to determine the number of multiframes it needs to read on the EC-AGCH in an attempt to find a response matching its last EC-RACH transmission (see sub-clause 3.5.2.1.2a).

FROM FIG. 5C

Bits
2 1
0 0 1 or more multiframes
0 1 2 or more multiframes
1 0 3 or more multiframes
1 1 4 or more multiframes

Tm (2 bits)
This field is used by a MS to determine the number of multiframes on the EC-RACH from which it randomly selects a transmission/retransmission opportunity (see sub-clause 3.5.2.1.2a).
Bits
2 1
0 0 1 or more multiframes
0 1 2 or more multiframes
1 0 3 or more multiframes
1 1 4 or more multiframes

Access_Timeslots (1 bit)
This field indicates whether random access mapped over two timeslots (e.g. TS 0 and TS 1, or, TS 2 and TS 3) shall be applied or not (see sub-clause 3.5.2.1.2a).
Bit
0 1 TS EC-RACH mapping shall be applied.
1 2 TS EC-RACH mapping shall be applied if uplink Coverage Class 2, Coverage Class 3 or Coverage Class 4 has been selected.
The number of EC-RACH supported in the cell is indicated by the EC_BS_CC_CHANS field provided in this message.

CC_Access_Adaptation (2 bits)
This field indicates whether the mobile station is allowed to increment its Coverage Class after one or more failed access attempts on the EC-RACH (see sub-clause 3.5.2.1.2a).
Bits
2 1
0 0 Coverage Class adaptation not allowed
0 1 Coverage Class adaptation after 1 failed EC-RACH transmission attempt
1 0 Coverage Class adaptation after 2 failed EC-RACH transmission attempts
1 1 Coverage Class adaptation after 3 failed EC-RACH transmission attempts

Cell_Bar_Access (1 bit)
This field indicates whether the cell is bared for access. It is encoded as the CELL_BAR_ACCESS field in the *RACH Control Parameters* IE defined in sub-clause 10.5.2.29.

FROM FIG. 5D

EC_Access_Control_Class (7 bits)
This field contains a bitmap indicating the barring status for Access Control Classes 0 to 15 (AC C0 to AC C15) applicable for the Common PLMN provided in this message.
The EC_Access_Control_Class field is encoded as follows.
Bits
7 6 5 4 3 2 1
x x x x x x x AC C15 AC C14 AC C13 AC C12 AC C11 AC C10 AC C0 to AC C9
For a mobile station with AC C = N access is not barred if the AC CN bit is coded with a "0"; N = 0, 1, .. 9, 11, .., 15. Access control for mobile stations belonging to one of the access control classes 0 to 9 (AC C0 to AC C9) is indicated by the first bit in the bitmap (bit 1).
For an MS in EC operation the AC C10 field is not used in this version of the specification.

Exception_Report_Status (1 bit)
This field indicates whether sending of exception reports are allowed or not. It is encoded as follows:
Bit
0 Sending of exception reports allowed in the cell for all MSs
1 Sending of exception reports not allowed in the cell except for the MSs that belong to one of the authorized Access Control Classes 11 to 15.

BT_Threshold_UL_Margin (3 bits)
This optional field indicates the power margin above BT_Threshold_UL used for (EC-)RACH open-loop power control. The use of this field is defined in 3GPP TS 45.008.

Short RACH Control Parameters struct
The Short RACH Control Parameters contains the access control parameters needed when accessing the network on the RACH on the common control channel (CCCH) on TS 0.
Max_Retrans (2 bits)
This field indicates the maximum number of retransmissions on RACH. It is encoded as the Max retrans field in the *RACH Control Parameters* IE defined in sub-clause 10.5.2.29.

Tx-integer (4 bits)
This field indicates the number of slots to spread the transmission on RACH. It is encoded as the Tx-integer field in the *RACH Control Parameters* IE defined in sub-clause 10.5.2.29.

Access_Control_Class (16 bits)
This field contains a bitmap indicating the barring status for Access Control Classes 0 to 15 (AC C0 to AC C15) applicable for the Common PLMN provided in this message. In the absence of this field, the Access Control Class information provided in the *EC-RACH Control Parameters* struct shall be used instead.

FROM FIG. 2E

The Access_Control_Class field is encoded as follows.

Bits

| | | | | | | | |
|---|---|---|---|---|---|---|---|
| 16 | 15 | ... | 1 | | | | |
| x | x | ... | x | AC C15 | AC C14 | ... | AC C0 |

For an MS in EC operation the AC C10 field is not used in this version of the specification.

EC Cell Options struct

ALPHA (4 bits)

This field is the binary representation of the parameter ? for MS output power control in units of 0.1, see 3GPP TS 45.008. For encoding and description of the ALPHA field see the *Global Power Control Parameters* IE in 3GPP TS 44.060.

T3168 (3 bits)

T3192 (3 bits)

These fields are defined in 3GPP TS 44.060.

T3226 (3 bits)

This field is the binary representation of the timeout value of timer T3226. Range: 0 to 7.

The timeout values are given in the following table.

| Bits<br>3 2 1 | |
|---|---|
| 0 0 0 | 20 ms |
| 0 0 1 | 60 ms |
| 0 1 0 | 100 ms |
| 0 1 1 | 200 ms |
| 1 0 0 | 500 ms |
| 1 0 1 | 700 ms |
| 1 1 0 | 1000 ms |
| 1 1 1 | 1200 ms |

T3248(2 bits)

This field is the binary representation of the timeout value of timer T3248. Range: 0 to 3.

The timeout values are given in the following table.

| Bits<br>2 1 | |
|---|---|
| 0 0 | not used |
| 0 1 | 1 second |
| 1 0 | 2 seconds |
| 1 1 | 3 seconds |

MS_ASSISTED_DCN

This field indicates if the cell supports MS assisted Dedicated Core Network selection, see 3GPP TS 23.401 [110].

0 The network does not support MS assisted Dedicated Core Network selection;

1 The network supports MS assisted Dedicated Core Network selection.

SI TYPE 3 MESSAGE:
604

602

FIGURE 10.5.2.11.1: *CONTROL CHANNEL DESCRIPTION* INFORMATION ELEMENT

| 8 | 7 | 6 | 5 | 4 | 3 | 2 | 1 | |
|---|---|---|---|---|---|---|---|---|
| | CONTROL CHANNEL DESCRIPTION IEI ||||||| OCTET 1 |
| MSCR | ATT | BS-AG-BLKS-RES ||| CCCH-CONF ||| OCTET 2 |
| SI22IND | CBQ3 || 0 SPARE | MSADCN | BS-PA-MFRMS ||| OCTET 3 |
| | | | | | 606 | | | |
| T 3212 TIME-OUT VALUE |||||||| OCTET 4 |

SI TYPE 3 MESSAGE:
604

602

TABLE 10.5.2.11.1: *CONTROL CHANNEL DESCRIPTION* INFORMATION ELEMENT

MSCR, MSC Release (octet 2)
Bit
8
0 MSC is Release '98 or older
1 MSC is Release '99 onwards
ATT, Attach-detach allowed (octet 2)
Bit
7
0 MSs in the cell are not allowed to apply IMSI attach and detach procedure.
1 MSs in the cell shall apply IMSI attach and detach procedure.

BS-AG-BLKS-RES (octet 2)
The BS-AG-BLKS-RES field is coded as the binary representation of the number of blocks reserved for access grant. In a cell that supports eDRX this field is subject to special requirements (see 3GPP TS 45.002 [32]).

Range
0 to 2 if CCCH-CONF = "001"
0 to 7 for other values of CCCH-CONF
All other values are reserved in the first case

CCCH-CONF (octet 2)
bits
3 2 1
0 0 0 1 basic physical channel used for CCCH, not combined with SDCCHs
0 0 1 1 basic physical channel used for CCCH, combined with SDCCHs
0 1 0 2 basic physical channel used for CCCH, not combined with SDCCHs
1 0 0 3 basic physical channel used for CCCH, not combined with SDCCHs
1 1 0 4 basic physical channels used for CCCH, not combined with SDCCHs
all other values are reserved

FROM FIG. 7A

SI22IND , SYSTEM INFORMATION TYPE 22 indicator (octet 3)
Bit
8
0 SI22 is not broadcast.
1 SI22 is broadcast.

CBQ3, Cell Bar Qualify 3 (octet 3)
Bits
7 6
0 0 *Iu mode* not supported
0 1 *Iu mode* capable MSs barred
1 0 *Iu mode* supported, cell not barred
1 1 *Iu mode* supported, cell not barred. The network shall not use this value.

NOTE: See 3GPP TS 45.008 for information on Cell Bar Qualify 3

MSADCN (octet 3)
This field indicates if the cell supports MS assisted Dedicated Core Network selection, see 3GPP TS 23.401 [110].
0 The network does not support MS assisted Dedicated Core Network selection;
1 The network supports MS assisted Dedicated Core Network selection.

606

BS-PA-MFRMS (octet 3)
Bits
3 2 1
0 0 0 2 multiframes period for transmission of PAGING REQUEST messages to the same paging subgroup

FROM FIG. 7B 0 0 1 3 multiframes period for transmission of PAGING REQUEST messages to the same paging subgroup 0 1 0 4 multiframes period for transmission of PAGING REQUEST messages to the same paging subgroup.

.

.

1 1 1 9 multiframes period for transmission of PAGING REQUEST messages to the same paging subgroup This field is not used by a MS that uses eDRX (see 3GPP TS 45.002 [32]).

NOTE: The number of different paging subchannels on the CCCH is:

MAX(1,(3 - BS-AG-BLKS-RES)) * BS-PA-MFRMS
if CCCH-CONF = "001"
(9 - BS-AG-BLKS-RES) * BS-PA-MFRMS
for other values of CCCH-CONF

T3212 timeout value (octet 4)

The T3212 timeout value field is coded as the binary representation of the timeout value for periodic updating in decihours.

Range: 1 to 255

The value 0 is used for infinite timeout value i.e. periodic updating shall not be used within the cell.

NOTE: THE MSC RELEASE BIT INDICATES THE VERSION OF THE MSC SPECIFIC PROTOCOLS AND IS NOT APPLICABLE TO ACCESS STRATUM PROTOCOLS.

FIG. 7C

SUPPORT OF MOBILE STATION ASSISTED DEDICATED CORE NETWORK SELECTION

CLAIM OF PRIORITY

This application claims the benefit of priority to U.S. Provisional Patent Application No. 62/505,035, filed May 11, 2017, the disclosure of which is fully incorporated herein by reference for all purposes.

TECHNICAL FIELD

The present disclosure relates generally to the wireless telecommunications field and, more particularly, to a Radio Access Network (RAN) node (e.g., BSS) and method for introducing one or more bits in any of the current system information (SI) messages or in a new SI message to ensure that a wireless device knows if a cell supports a Mobile Station Assisted Dedicated Core Network Selection such that the wireless device upon receipt of the SI message can transmit uplink Radio Link Control (RLC)/Media Access Control (MAC) radio blocks that will match the capability of the RAN node (e.g., BSS). In addition, the present disclosure relates to the wireless device and method for receiving a SI message from the RAN node (e.g., BSS) that indicates if a cell supports the Mobile Station Assisted Dedicated Core Network Selection such that the wireless device can then transmit uplink RLC/MAC radio blocks that will match the capability of the RAN node (e.g., BSS).

BACKGROUND

The following abbreviations and term are herewith defined, at least some of which are referred to within the following description of the present disclosure.

3GPP 3rd-Generation Partnership Project
ASIC Application Specific Integrated Circuit
BLER Block Error Rate
BSS Base Station Subsystem
BTS Base Transceiver Station
CC Coverage Class
CN Core Network
CR Change Request
DCN Dedicated Core Network
EC Extended Coverage
EC-GSM Extended Coverage Global System for Mobile Communications
EC-RACH Extended Coverage Random Access Channel
eNB Evolved Node B
EDGE Enhanced Data rates for GSM Evolution
EGPRS Enhanced General Packet Radio Service
E-UTRAN Evolved Universal Terrestrial Radio Access Network
GSM Global System for Mobile Communications
GERAN GSM/EDGE Radio Access Network
GPRS General Packet Radio Service
HARQ Hybrid Automatic Repeat Request
IE Information Element
IoT Internet of Things
LTE Long-Term Evolution
MAC Media Access Control
MCS Modulation and Coding Scheme
MME Mobility Management Entity
MS Mobile Station
MSADCN Mobile Station Assisted Dedicated Core Network Selection
MTC Machine Type Communications NAS Non-Access Stratum
NB Narrow Band
NB-IoT Narrow Band-Internet of Things
PDN Packet Data Network
PLMN Public Land Mobile Network
RACH Random Access Channel
RAN Radio Access Network
RAT Radio Access Technology
RAU Routing Area Update
SGSN Serving GPRS Support Node
TS Technical Specification
UE User Equipment
UTRAN Universal Terrestrial Radio Access Network
WB-E-UTRAN Wideband Evolved Universal Terrestrial Radio Access Network
WCDMA Wideband Code Division Multiple Access
WiMAX Worldwide Interoperability for Microwave Access Extended Coverage (EC): The general principle of extended coverage is that of using blind transmissions for the control channels and for the data channels to realize a target block error rate (BLER) performance for the channel of interest. In addition, for the data channels the use of blind transmissions assuming MCS-1 (i.e., the lowest modulation and coding scheme (MCS) supported in EGPRS today) is combined with HARQ retransmissions to realize the needed level of data transmission performance. Support for extended coverage is realized by defining different coverage classes. A different number of blind transmissions are associated with each of the coverage classes wherein extended coverage is associated with coverage classes for which multiple blind transmissions are needed (i.e., a single blind transmission is considered as the reference coverage). The number of total blind transmissions for a given coverage class can differ between different logical channels.

The 3rd-Generation Partnership Project (3GPP) has specified an optional feature called Dedicated Core Networks (DCNs) which enables an operator to deploy one or more DCNs where each DCN comprises one or more Core Network (CN) nodes (e.g., Serving GPRS Support Node (SGSNs)). Each DCN may be dedicated to serve a specific type(s) of subscriber(s), one or more Public Land Mobile Networks (PLMNs), and one or more Radio Access Technologies (RATs) (e.g., GSM/EDGE Radio Access Network (GERAN), Universal Terrestrial Radio Access Network (UTRAN), Evolved UTRAN (E-UTRAN), Wideband E-UTRAN (WB-E-UTRAN), and Narrow Band Internet of Things (NB-IoT)).

Moreover, as an enhancement, and in order to reduce the potential need for Non-Access Stratum (NAS) message re-routing when a mobile station (MS)/user equipment (UE)/wireless device first enters a cell within a new Routing Area or at initial attach, another feature called UE/MS Assisted Dedicated Core Network Selection has also been specified by 3GPP. This feature relies on an indication (DCN-ID) sent from the MS/UE wherein the Radio Access Network (RAN) uses the indication to select the correct Dedicated Core Network (see 3GPP Technical Specification (TS) 23.401 V 14.3.0 (2017-03) (General Packet Radio Service (GPRS) enhancements for Evolved Universal Terrestrial Radio Access Network (E-UTRAN) access (Release 14))—the contents of which are hereby incorporated herein by reference for all purposes). The selection of a DCN-ID by a MS/UE is guided by the MS's/UE's ranking of available PLMNs from most to least preferred (i.e., a MS/UE can be equipped with PLMN specific DCN-ID values). At the Radio Access Network (RAN) Meeting #75, Change Requests (CRs) were approved to introduce support for the MS/UE Assisted Dedicated Core Network Selection feature for UTRAN and E-UTRAN. However, support for the MS Assisted Dedicated Core Network Selection feature in GERAN is still lacking.

A problem with the current GERAN specification is that the MS is unaware of whether the network (cell) supports the MS Assisted Dedicated Core Network Selection feature or not. Thus, a MS that supports and attempts to use the MS Assisted Dedicated Core Network Selection feature in a cell that does not support this feature implies that there will be a mismatch in the signaling between the MS to the Base Station Subsystem (BSS). This will, in cells that do not support the MS Assisted Dedicated Core Network Selection feature, lead to reception by the BSS of uplink Radio Link Control (RLC)/Media Access Control (MAC) radio blocks from the MS that will not be understood by the BSS when they have been configured to include DCN-ID information. This in turn results in the inability of the BSS to extract a higher layer message (e.g., a NAS Routing Area Update (RAU) message) sent by the MS which results in NAS layer signalling failure. In view of the foregoing, it can be seen there is a need to address at least the aforementioned problems of the state-of-the art. The present disclosure addresses at least these problems.

SUMMARY

A RAN node, a wireless device, and various methods for addressing the aforementioned problems are described in the independent claims. Advantageous embodiments of the RAN node, the wireless device, and the various methods are further described in the dependent claims.

In one aspect, the present disclosure provides a RAN node configured to interact with a wireless device. The RAN node comprises a processor and a memory that stores processor-executable instructions, wherein the processor interfaces with the memory to execute the processor-executable instructions, whereby the RAN node is operable to perform a transmit operation. In the transmit operation, the RAN node transmits to the wireless device a SI message that includes one or more bits to ensure that the wireless device knows if a cell supports a Mobile Station Assisted Dedicated Core Network Selection. In one embodiment, the SI message is a SI 13 message that includes a SI 13 Rest Octets information element which includes a one bit MS_ASSISTED_DCN field which ensures that the wireless device knows if the cell supports the Mobile Station Assisted Dedicated Core Network Selection. In another embodiment, the SI message is an Extended Coverage (EC) SI Type 2 message that includes a one bit MS_ASSISTED_DCN field which ensures that the wireless device knows if the cell supports the Mobile Station Assisted Dedicated Core Network Selection. In yet another embodiment, the SI message is a SI type 3 message that includes a Control Channel Description information element which includes one bit used to ensure that the wireless device knows if the cell supports the Mobile Station Assisted Dedicated Core Network Selection. An advantage of the RAN node performing the transmit operation is that the RAN node will subsequently receive from the wireless device a RLC/MAC radio block that will match the capability of the RAN node, thereby allowing the RAN node to successfully extract information pertaining to a higher layer message (e.g., a NAS Routing Area Update message) that is at least partially carried within the received RLC/MAC radio block.

In another aspect, the present disclosure provides a method in a RAN node configured to interact with a wireless device. The method comprises a transmitting step. In the transmitting step, the RAN node transmits to the wireless device a SI message that includes one or more bits to ensure that the wireless device knows if a cell supports a Mobile Station Assisted Dedicated Core Network Selection. In one embodiment, the SI message is a SI 13 message that includes a SI 13 Rest Octets information element which includes a one bit MS_ASSISTED_DCN field which ensures that the wireless device knows if the cell supports the Mobile Station Assisted Dedicated Core Network Selection. In another embodiment, the SI message is an Extended Coverage (EC) SI Type 2 message that includes a one bit MS_ASSISTED_DCN field which ensures that the wireless device knows if the cell supports the Mobile Station Assisted Dedicated Core Network Selection. In yet another embodiment, the SI message is a SI type 3 message that includes a Control Channel Description information element which includes one bit used to ensure that the wireless device knows if the cell supports the Mobile Station Assisted Dedicated Core Network Selection. An advantage of the RAN node performing the transmitting step is that the RAN node will subsequently receive from the wireless device a RLC/MAC radio block that will match the capability of the RAN node, thereby allowing the RAN node to successfully extract information pertaining to a higher layer message (e.g., a NAS Routing Area Update message) that is at least partially carried within the received RLC/MAC radio block.

In yet another aspect, the present disclosure provides a wireless device configured to interact with a RAN node. The wireless device comprises a processor and a memory that stores processor-executable instructions, wherein the processor interfaces with the memory to execute the processor-executable instructions, whereby the wireless device is operable to perform a receive operation. In the receive operation, the wireless device receives from the RAN node a SI message that includes one or more bits to ensure that the wireless device knows if a cell supports a Mobile Station Assisted Dedicated Core Network Selection. In one embodiment, the SI message is a SI 13 message that includes a SI 13 Rest Octets information element which includes a one bit MS_ASSISTED_DCN field which ensures that the wireless device knows if the cell supports the Mobile Station Assisted Dedicated Core Network Selection. In another embodiment, the SI message is an Extended Coverage (EC) SI Type 2 message that includes a one bit MS_ASSISTED_DCN field which ensures that the wireless device knows if the cell supports the Mobile Station Assisted Dedicated Core Network Selection. In yet another embodiment, the SI message is a SI type 3 message that includes a Control Channel Description information element which includes one bit used to ensure that the wireless device knows if the cell supports the Mobile Station Assisted Dedicated Core Network Selection. An advantage of the wireless device performing the receive operation is that it enables the wireless device to subsequently transmit to the RAN node a RLC/MAC radio block that will match the capability of the RAN node, thereby allowing the RAN node to successfully extract information pertaining to a higher layer message (e.g., a NAS Routing Area Update message) that is at least partially carried within the received RLC/MAC radio block.

In yet another aspect, the present disclosure provides a method in a wireless device configured to interact with a RAN node. The method comprises a receiving step. In the receiving step, the wireless device receives from the RAN node a SI message that includes one or more bits to ensure that the wireless device knows if a cell supports a Mobile Station Assisted Dedicated Core Network Selection. In one embodiment, the SI message is a SI 13 message that includes a SI 13 Rest Octets information element which includes a one bit MS_ASSISTED_DCN field which ensures that the wireless device knows if the cell supports the Mobile Station Assisted Dedicated Core Network Selection. In another embodiment, the SI message is an Extended Coverage (EC) SI Type 2 message that includes a one bit MS_ASSISTED_DCN field which ensures that the wireless device knows if the cell supports the Mobile Station Assisted Dedicated Core Network Selection. In yet another embodiment, the SI message is a SI type 3 message that includes a Control Channel Description information element which includes one bit used to ensure that the wireless device knows if the cell supports the Mobile Station Assisted Dedicated Core Network Selection. An advantage of the wireless device performing the receiving step is that it enables the wireless device to subsequently transmit to the RAN node a RLC/MAC radio block that will match the capability of the RAN node, thereby allowing the RAN node to successfully extract information pertaining to a higher layer message (e.g., a NAS Routing Area Update message) that is at least partially carried within the received RLC/MAC radio block.

Additional aspects of the present disclosure will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the present disclosure.

BRIEF DESCRIPTION OF THE DRAWINGS

A more complete understanding of the present disclosure may be obtained by reference to the following detailed description when taken in conjunction with the accompanying drawings:

FIGS. 2A-2B illustrate the current specification 3GPP TS 44.018 V 14.1.0 (2017-03)'s table 10.5.2.37b.1 which has been changed to include a new 1 bit extension field called MS_ASSISTED_DCN to the SI 13 Rest Octets IE of the System Information type 13 message per a first embodiment of the present disclosure;

FIGS. 3A-3C illustrate the current specification 3GPP TS 44.018 V 14.1.0 (2017-03)'s table 10.5.2.37b.2 which has been changed to include a new 1 bit extension field called MS_ASSISTED_DCN to the SI 13 Rest Octets IE System Information type 13 message per the first embodiment of the present disclosure;

FIGS. 4A-4B illustrate the current specification 3GPP TS 44.018 V 14.1.0 (2017-03)'s figure 9.1.43q.1 which has been changed to include a new 1 bit extension field called MS_ASSISTED_DCN to the EC System Information type 2 message (EC-SI2 message) per a second embodiment of present disclosure;

FIGS. 5A-5F illustrates the current specification 3GPP TS 44.018 V 14.1.0 (2017-03)'s table 9.1.43q.1 which has been changed to include a new 1 bit extension field called MS_ASSISTED_DCN to the EC System Information type 2 message (EC-SI2 message) per the second embodiment of present disclosure;

FIGS. 7A-7C) illustrate the current specification 3GPP TS 44.018 V 14.1.0 (2017-03)'s table 10.5.2.11.1 which has been changed where one of the previous spare bits is now labeled as MSADCN and is used in the System Information type 3 message per the third embodiment of present disclosure;

DETAILED DESCRIPTION

Figure 1:
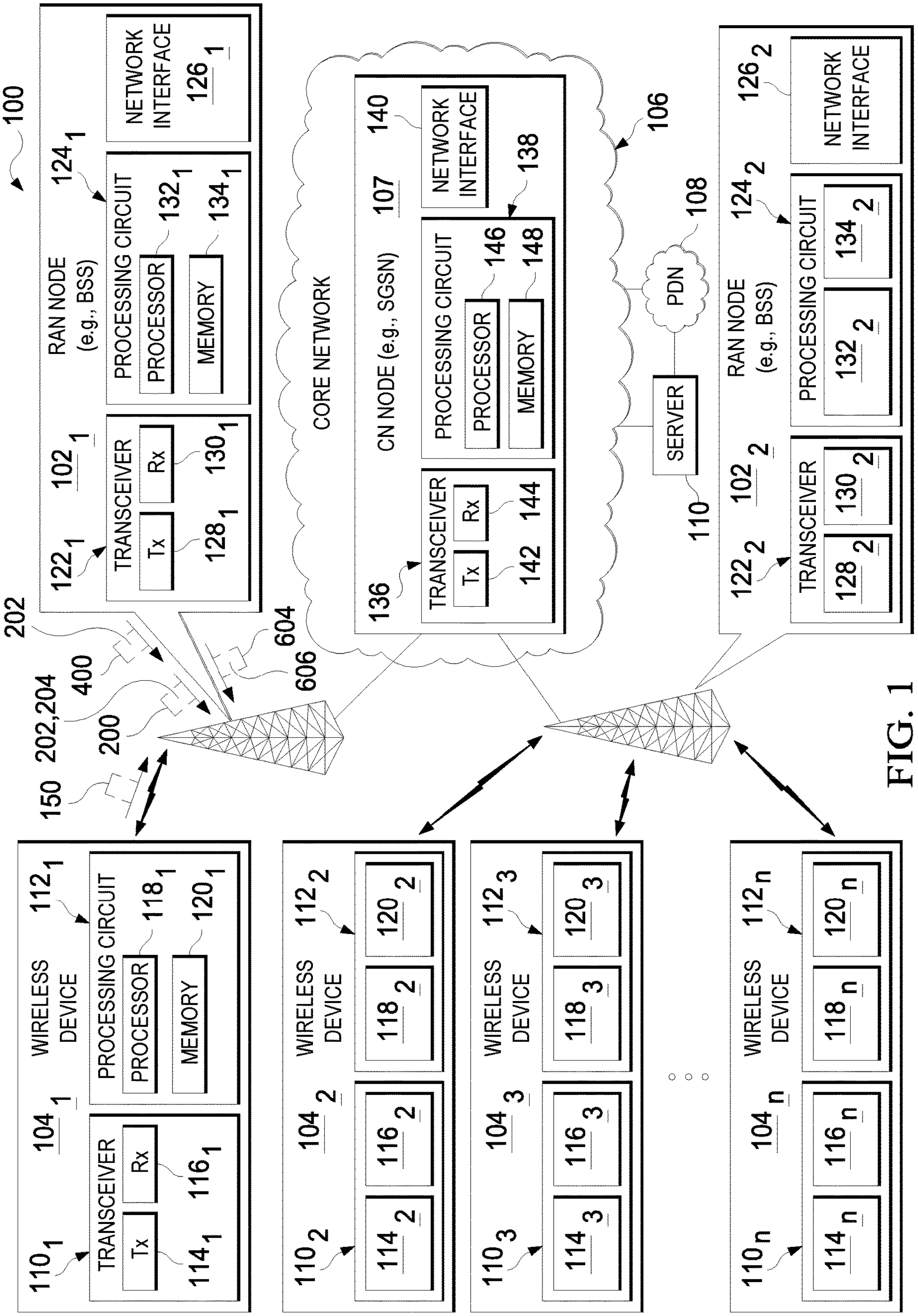
FIG. 1 is a diagram of an exemplary wireless communication network which includes a CN node, multiple RAN nodes, and multiple wireless devices configured in accordance with an embodiment of the present disclosure.
Figure 6:
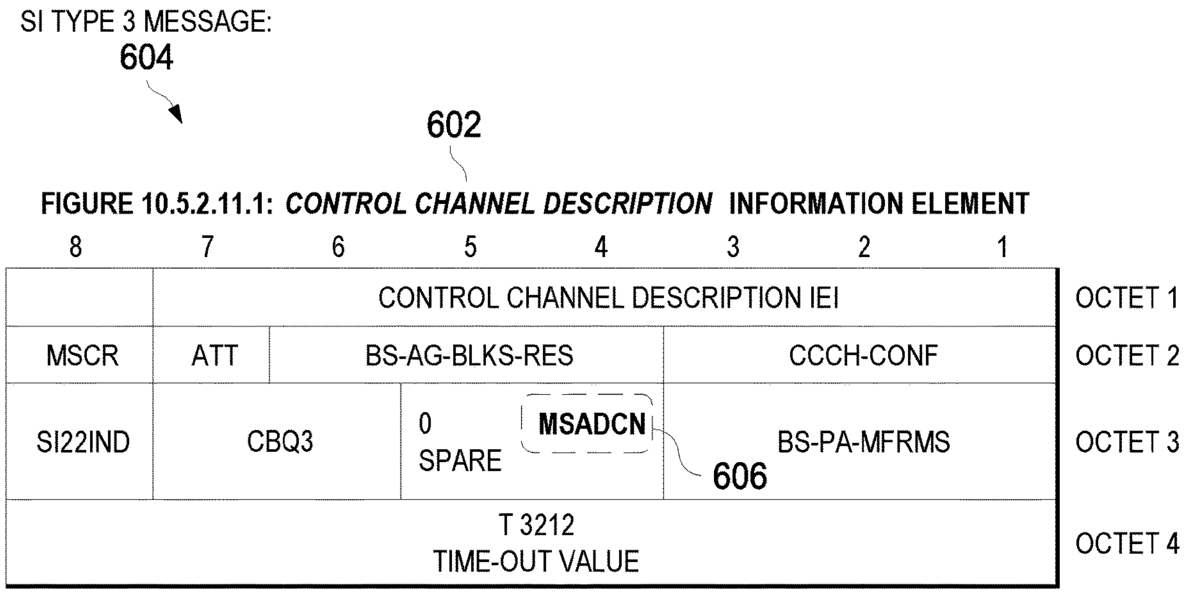
FIG. 6 illustrates the current specification 3GPP TS 44.018 V 14.1.0 (2017-03)'s figure 10.5.2.11.1 which has been changed where one of the previous spare bits is now labeled as MSADCN and is used in the System Information type 3 message to indicate if a cell supports MS Assisted Dedicated Core Network Selection per a third embodiment of present disclosure.

A discussion is first provided herein to describe an exemplary wireless communication network that includes a CN node (e.g., SGSN), multiple RAN nodes (e.g., BSSs), and multiple wireless devices (e.g., mobile stations) which are configured in accordance with different embodiments of the present disclosure (see FIG. 1). Then, a discussion is provided to disclose various embodiments of the present disclosure as to how the RAN node (e.g., BSS) can ensure that a wireless device (e.g., mobile station) knows if a cell (network) supports the MS Assisted Dedicated Core Network Selection feature such that the mobile station can transmit uplink Radio Link Control (RLC)/Media Access Control (MAC) radio blocks that will match the capability of the RAN node (e.g., BSS) (see FIGS. 2-7). Thereafter, a discussion is provided to explain the basic functionalities-configurations of the RAN node (e.g., BSS), and the wireless devices (e.g., mobile stations) in accordance with different embodiments of the present disclosure (see FIGS. 8-11).

Exemplary Wireless Communication Network 100

Referring to FIG. 1, there is illustrated an exemplary wireless communication network 100 in accordance with the present disclosure. The wireless communication network 100 includes a core network 106 (which comprises at least one CN node 107) and multiple RAN nodes $\mathbf{102}_1$ and $\mathbf{102}_2$ (only two shown) which interface with multiple wireless devices $\mathbf{104}_1$, $\mathbf{104}_2$, $\mathbf{104}_3$ . . . $\mathbf{104}_n$. The wireless communication network 100 also includes many well-known components, but for clarity, only the components needed to describe the features of the present disclosure are described herein. Further, the wireless communication network 100 is described herein as being a GSM/EGPRS wireless communication network 100 which is also known as an EDGE wireless communication network 100. However, those skilled in the art will readily appreciate that the techniques of the present disclosure which are applied to the GSM/EGPRS wireless communication network 100 are generally applicable to other types of wireless communication systems, including, for example, WCDMA, LTE, and WiMAX systems.

The wireless communication network 100 includes the RAN nodes $\mathbf{102}_1$ and $\mathbf{102}_2$ (wireless access nodes-only two shown) which provide network access to the wireless devices $104_1$, $104_2$, $104_3$ . . . $104_n$. In this example, the RAN node $102_1$ is providing network access to wireless device $104_1$ while the RAN node $102_2$ is providing network access to wireless devices $104_2$, $104_3$ . . . $104_n$. The RAN nodes $102_1$ and $102_2$ are connected to the core network 106 (e.g., SGSN core network 106) and, in particular, to the CN node 107 (e.g., SGSN 107). The core network 106 is connected to an external packet data network (PDN) 108, such as the Internet, and a server 110 (only one shown). The wireless devices $104_1$, $104_2$, $104_3$ . . . $104_n$ may communicate with one or more servers 110 (only one shown) connected to the core network 106 and/or the PDN 108.

The wireless devices $104_1$, $104_2$, $104_3$ . . . $104_n$ may refer generally to an end terminal (user) that attaches to the wireless communication network 100, and may refer to either a MTC device (e.g., a smart meter) or a non-MTC device. Further, the term "wireless device" is generally intended to be synonymous with the term mobile device, mobile station (MS). "User Equipment," or UE, as that term is used by 3GPP, and includes standalone wireless devices, such as terminals, cell phones, smart phones, tablets, cellular IoT devices, IoT devices, and wireless-equipped personal digital assistants, as well as wireless cards or modules that are designed for attachment to or insertion into another electronic device, such as a personal computer, electrical meter, etc.

Likewise, unless the context clearly indicates otherwise, the term RAN node $102_1$ and $102_2$ (wireless access node $102_1$ and $102_2$) is used herein in the most general sense to refer to a base station, a wireless access node, or a wireless access point in a wireless communication network 100, and may refer to RAN nodes $102_1$ and $102_2$ that are controlled by a physically distinct radio network controller as well as to more autonomous access points, such as the so-called evolved Node Bs (eNodeBs) in Long-Term Evolution (LTE) networks.

Each wireless device $104_1$, $104_2$, $104_3$ . . . $104_n$ may include a transceiver circuit $110_1$, $110_2$, $110_3$ . . . $110_n$ for communicating with the RAN nodes $102_1$ and $102_2$, and a processing circuit $112_1$, $112_2$, $112_3$ . . . $112_n$ for processing signals transmitted from and received by the transceiver circuit $110_1$, $110_2$, $110_3$ . . . $110_n$ and for controlling the operation of the corresponding wireless device $104_1$, $104_2$, $104_3$ . . . $104_n$. The transceiver circuit $110_1$, $110_2$, $110_3$ . . . $110_n$ may include a transmitter $114_1$, $114_2$, $114_3$ . . . $114_n$ and a receiver $116_1$, $116_2$, $116_3$ . . . $116_n$, which may operate according to any standard, e.g., the GSM/EDGE standard. The processing circuit $112_1$, $112_2$, $112_3$ . . . $112_n$ may include a processor $118_1$, $118_2$, $118_3$ . . . $118_n$ and a memory $120_1$, $120_2$, $120_3$ . . . $120_n$ for storing program code for controlling the operation of the corresponding wireless device $104_1$, $104_2$, $104_3$ . . . $104_n$. The program code may include code for performing the procedures as described hereinafter.

Each RAN node $102_1$ and $102_2$ (wireless access node $102_1$ and $102_2$) may include a transceiver circuit $122_1$ and $122_2$ for communicating with wireless devices $104_1$, $104_2$, $104_3$ . . . $104_n$, a processing circuit $124_1$ and $124_2$ for processing signals transmitted from and received by the transceiver circuit $122_1$ and $122_2$ and for controlling the operation of the corresponding RAN node $102_1$ and $102_2$, and a network interface $126_1$ and $126_2$ for communicating with the core network 106. The transceiver circuit $122_1$ and $122_2$ may include a transmitter $128_1$ and $128_2$ and a receiver $130_1$ and 3102, which may operate according to any standard, e.g., the GSM/EDGE standard. The processing circuit $124_1$ and $124_2$ may include a processor $132_1$ and 122, and a memory $134_1$ and $114_2$ for storing program code for controlling the operation of the corresponding RAN node $102_1$ and $102_2$. The program code may include code for performing the procedures as described hereinafter.

The CN node 107 (e.g., SGSN 107, MME 107) may include a transceiver circuit 136 for communicating with one or more RAN nodes, e.g., the RAN nodes $102_1$ and $102_2$, a processing circuit 138 for processing signals transmitted from and received by the transceiver circuit 136 and for controlling the operation of the CN node 107, and a network interface 140 for communicating with one or more RAN nodes, e.g., the RAN nodes $102_1$ and $102_2$. The transceiver circuit 136 may include a transmitter 142 and a receiver 144, which may operate according to any standard, e.g., the GSM/EDGE standard. The processing circuit 138 may include a processor 146 and a memory 148 for storing program code for controlling the operation of the CN node 107. The program code may include code for performing the procedures as described hereinafter.

Techniques for Ensuring that MS Knows if a Cell Supports the MS Assisted DCN Selection The present disclosure addresses the problems of the state-of-the-art described above in the Background Section. More specifically, the present disclosure addresses the problems of the state-of-the-art by introducing one or more bits in any of the current system information messages or in a new system information message that are transmitted by the RAN node $102_1$ (e.g., BSS $102_1$) (for example) to ensure that the MS $104_1$ (for example) knows if a cell (network) supports MS Assisted Dedicated Core Network Selection. A detailed discussion is provided below to describe several different ways that the RAN node $102_1$ (e.g., BSS $102_1$) can introduce one or more bits into any of the current system information messages or in a new system information message that are transmitted to the MS $104_1$ to ensure that the MS $104_1$ knows whether or not the cell (network) supports MS Assisted Dedicated Core Network Selection.

In a first embodiment, the objective of enabling the RAN node $102_1$ (e.g., BSS $102_1$) to ensure that the MS $104_1$ knows if a cell supports MS Assisted Dedicated Core Network Selection is achieved by introducing one or more bits in a System Information type 13 (SI 13) message 200. This can be done by introducing a new one bit extension field referred to herein as MS_ASSISTED_DCN 202 which can be added as a Rel-14 extension to the current specification 3GPP TS 44.018 V 14.1.0 (2017-03) where the contents of this specification are hereby incorporated by reference herein for all purposes. In one example, the current specification 3GPP TS 44.018 V 14.1.0 (2017-03)'s section 10.5.2.37b which has the excerpt below can be changed to include the new 1 bit extension field called MS_ASSISTED_DCN 202 in a SI 13 Rest Octets information element 204 of the System Information type 13 message 200 per the first embodiment of present disclosure. The excerpt is as follows:

10.5.2.37b SI 13 Rest Octets

The SI 13 Rest Octets information element is coded according to the syntax specified below and described in tables 10.5.2.37b.1 and 10.5.2.37b.2.

The SI 13 Rest Octets information element is a type 5 information element with 20 octets length.

More specifically, the current specification 3GPP TS 44.018 V 14.1.0 (2017-03)'s tables 10.5.2.37b.1 (see FIGS. 2A-2B) and 10.5.2.37b.2 (see FIGS. 3A-3C) can be changed as shown to include the new 1 bit extension field called MS_ASSISTED_DCN 202 to the SI 13 Rest Octets information element 204 in the System Information type 13 message 200 per the first embodiment of present disclosure.

It should be noted that there can be multiple variations of this embodiment which can achieve the same objective where e.g., the new field name can have a different name other than MS_ASSISTED_DCN 202 or where the support in the specification is introduced in a later release.

In a second embodiment, the objective of enabling the RAN node $102_1$ (e.g., BSS $102_1$) to ensure that the MS $104_1$ knows if a cell supports MS Assisted Dedicated Core Network Selection is achieved by introducing one or more bits in the EC System Information type 2 message 400 (EC-SI2 message 400). This can be done by introducing a new one bit extension field referred to herein as MS_ASSISTED_DCN 202 which can be added as a Rel-14 extension to the current specification 3GPP TS 44.018 V 14.1.0 (2017-03). In one example, the current specification 3GPP TS 44.018 V 14.1.0 (2017-03)'s section 9.1.43q which has the excerpt below can be changed to include the new 1 bit extension field called MS_ASSISTED_DCN 202 in the EC System Information type 2 message 400 (EC-SI2 message 400) per the second embodiment of present disclosure. The excerpt is as follows:

9.1.43q EC System Information Type 2

This message is sent on the EC-BCCH if EC-GSM-IoT is supported in the cell. It is sent by the network providing EC-RACH/RACH control information and cell selection information to mobile stations that have enabled EC operation. Multiple instances of this message may be sent by the network. The requirements for transmission of this message are defined in 3GPP TS 45.002.

Message type: EC SYSTEM INFORMATION TYPE 2

Significance: dual

Figure 9:
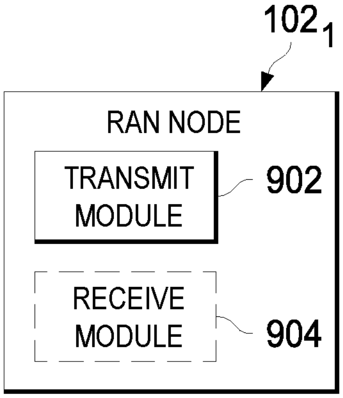
FIG. 9 is a block diagram illustrating a structure of the RAN node configured in accordance with an embodiment of the present disclosure.

More specifically, the current specification 3GPP TS 44.018 V 14.1.0 (2017-03)'s FIG. 9.1.43q.1 (see FIGS. 4A-4B) and table 9.1.43q.1 (see FIGS. 5A-5F) can be changed as shown to include the new 1 bit extension field called MS_ASSISTED_DCN 202 to the EC System Information type 2 message 400 (EC-SI2 message 400) per the second embodiment of present disclosure. It should be noted that there can be multiple variations of this embodiment which can achieve the same objective where e.g., the new field name can have a different name other than MS_ASSISTED_DCN 202 or where the support in the specification is introduced in a later release.

In a third embodiment, the objective of enabling the RAN node $102_1$ (e.g., BSS $102_1$) to ensure that the MS $104_1$ knows if a cell supports MS Assisted Dedicated Core Network Selection is achieved by using any of the available spare bits in any of the existing system information messages. For example, the RAN node $102_1$ (e.g., BSS $102_1$) can ensure that the MS $104_1$ knows if a cell supports MS Assisted Dedicated Core Network Selection by using one of the remaining spare bits in the Control Channel Description Information Element (IE) 602 in a System Information type 3 message 604 which is described in the current specification 3GPP TS 44.018 V 14.1.0 (2017-03)'s section 10.5.2.11. In this regard, the current specification 3GPP TS 44.018 V 14.1.0 (2017-03)'s section 10.5.2.11 which has the excerpt below can be changed to use one of the spare bits labeled is MSADCN 606 to indicate if a cell supports MS Assisted Dedicated Core Network Selection per the third embodiment of present disclosure. The excerpt is as follows:

10.5.2.11 Control Channel Description

The purpose of the Control Channel Description information element is to provide a variety of information about a cell.

Figure 10:
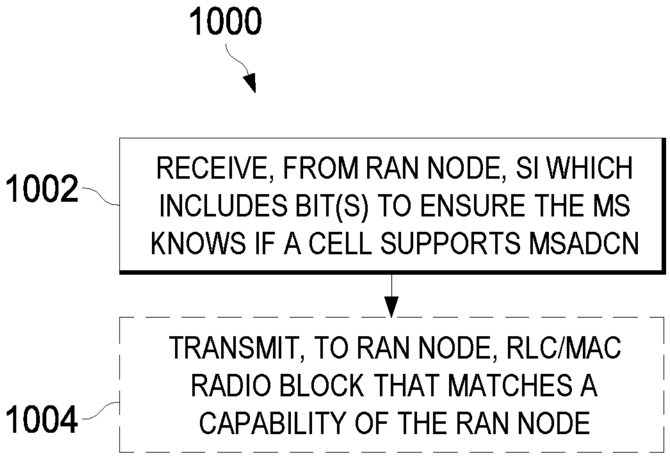
FIG. 10 is a flowchart of a method implemented in the wireless device in accordance with an embodiment of the present disclosure; and, FIG. 11 is a block diagram illustrating a structure of the wireless device configured in accordance with an embodiment of the present disclosure.

The Control Channel Description information element is coded as shown in figure 10.5.2.11.1 and table 10.5.2.11.1.

The Control Channel Description is a type 3 information element with 4 octets length.

More specifically, the current specification 3GPP TS 44.018 V 14.1.0 (2017-03)'s figure 10.5.2.11.1 (see FIG. 6) and table 10.5.2.11.1 (see FIGS. 7A-7C) can be changed as shown where one of the previous spare bits is now labeled as MSADCN 606 and used in the SI type 3 message 604 to indicate if a cell supports MS Assisted Dedicated Core Network Selection per the third embodiment of present disclosure. It should be noted that there can be multiple variations of this embodiment which can achieve the same objective where e.g., the new MASDCN name 606 can have a different name when the support in the specification is introduced in a later release.

An advantage with the different embodiments of the present disclosure described above is that the RAN node $102_1$ by introducing one or more bits in any of the current system information messages or in a new system information message to ensure that the wireless device $104_1$ knows if a cell supports a Mobile Station Assisted Dedicated Core Network Selection enables the wireless device $104_1$ to transmit uplink Radio Link Control (RLC)/Media Access Control (MAC) radio blocks 150 that will match the capability of the RAN node $102_1$ (e.g., BSS $102_1$). This then allows the RAN node $102_1$ to successfully extract information pertaining to a higher layer message (e.g., a NAS Routing Area Update message) that is at least partially carried within the uplink RLC/MAC radio block 150 in which the MS Assisted Dedicated Core Network indication is provided. It should be appreciated that the other RAN node $102_2$ may be configured the same as RAN node $102_1$ to introduce one or more bits in any of the current system information messages or in a new system information message to ensure that the wireless devices $104_2$, $104_3$ . . . $104_n$ know if a cell supports a Mobile Station Assisted Dedicated Core Network Selection enables the wireless devices $104_2$, $104_3$ . . . $104_n$ to transmit uplink Radio Link Control (RLC)/Media Access Control (MAC) radio blocks that will match the capability of the RAN node $102_2$ (e.g., BSS $102_2$).

Basic Functionalities-Configurations of Wireless Device $104_1$ (for Example) and RAN Node $102_1$ (for Example)

Figure 8:
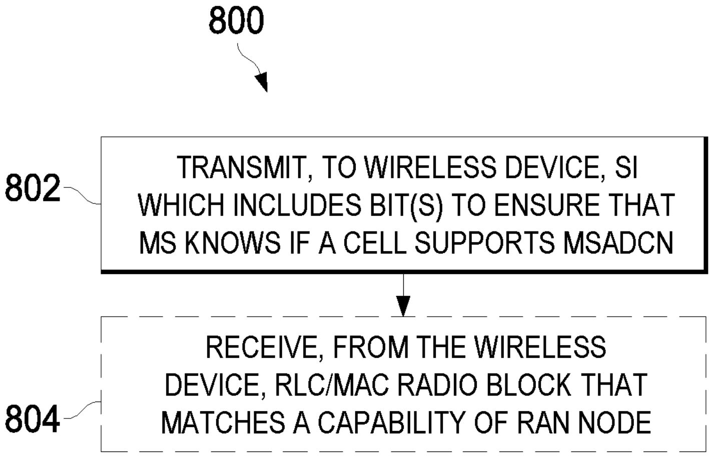
FIG. 8 is a flowchart of a method implemented in the RAN node in accordance with an embodiment of the present disclosure.

Referring to FIG. 8, there is a flowchart of a method 800 implemented in the RAN node $102_1$ which is configured to interact with the wireless device $104_1$ in accordance with an embodiment of the present disclosure. At step 802, the RAN node $102_1$ transmits to the wireless device $104_1$ a SI message 200, 400, 604 that includes one or more bits to ensure that the wireless device knows if a cell supports a Mobile Station Assisted Dedicated Core Network Selection. In one embodiment, the SI message 200, 400, 604 is a SI 13 message 200 that includes a SI 13 Rest Octets information element 204 which includes a one bit MS_ASSISTED_DCN field 202 which ensures that the wireless device $104_1$ knows if the cell supports the Mobile Station Assisted Dedicated Core Network Selection (see discussion above with respect to FIGS. 2-3). In another embodiment, the SI message 200, 400, 604 is an Extended Coverage (EC) SI Type 2 message 400 that includes a one bit MS_ASSISTED_DCN field 202 which ensures that the wireless device $104_1$ knows if the cell supports the Mobile Station Assisted Dedicated Core Network Selection (see discussion above with respect to FIGS. 4-5). In yet another embodiment, the SI message 200, 400, 604 is a SI type 3 message 604 that includes a Control Channel Description information element 602 which includes one bit 606 used to ensure that the wireless device $104_1$ knows if the cell supports the Mobile Station Assisted Dedicated Core Network Selection (see discussion above with respect to FIGS. 6-7). At step 804, the RAN node $\mathbf{102}_1$ in response to the transmission of the SI message 200, 400, 604 receives from the wireless device $\mathbf{104}_1$ one or more RLC/MAC radio blocks 150 that match a capability of the RAN node $\mathbf{102}_1$.

Referring to FIG. 9, there is a block diagram illustrating structures of an exemplary RAN node $\mathbf{102}_1$ configured in accordance with an embodiment of the present disclosure. In one embodiment, the RAN node $\mathbf{102}_1$ comprises a transmit module 902, and a receive module 904. The transmit module 902 is configured to transmit to the wireless device $\mathbf{104}_1$ a SI message 200, 400, 604 that includes one or more bits to ensure that the wireless device knows if a cell supports a Mobile Station Assisted Dedicated Core Network Selection. In one embodiment, the SI message 200, 400, 604 is a SI 13 message 200 that includes a SI 13 Rest Octets information element 204 which includes a one bit MS_ASSISTED_DCN field 202 which ensures that the wireless device $\mathbf{104}_1$ knows if the cell supports the Mobile Station Assisted Dedicated Core Network Selection (see discussion above with respect to FIGS. 2-3). In another embodiment, the SI message 200, 400, 604 is an Extended Coverage (EC) SI Type 2 message 400 that includes a one bit MS_ASSISTED_DCN field 202 which ensures that the wireless device $\mathbf{104}_1$ knows if the cell supports the Mobile Station Assisted Dedicated Core Network Selection (see discussion above with respect to FIGS. 4-5). In yet another embodiment, the SI message 200, 400, 604 is a SI type 3 message 604 that includes a Control Channel Description information element 602 which includes one bit 606 used to ensure that the wireless device $\mathbf{104}_1$ knows if the cell supports the Mobile Station Assisted Dedicated Core Network Selection (see discussion above with respect to FIGS. 6-7). The transmit module 904 is configured to receive from the wireless device $\mathbf{104}_1$ one or more RLC/MAC radio blocks 150 that match a capability of the RAN node $\mathbf{102}_1$. In addition, it should be noted that the RAN node 102: may also include other components, modules or structures which are well-known, but for clarity, only the components, modules or structures needed to describe the features of the present disclosure are described herein.

As those skilled in the art will appreciate, the above-described modules 902 and 904 of the RAN node $\mathbf{102}_1$ may be implemented as suitable dedicated circuit. Further, the modules 902 and 904 can also be implemented using any number of dedicated circuits through functional combination or separation. In some embodiments, the modules 902 and 904 may be even combined in a single application specific integrated circuit (ASIC). As an alternative software-based implementation, the RAN node 102: may comprise a memory $\mathbf{134}_1$, a processor $\mathbf{132}_1$ (including but not limited to a microprocessor, a microcontroller or a Digital Signal Processor (DSP), etc.) and a transceiver $\mathbf{122}_1$. The memory $\mathbf{134}_1$ stores machine-readable program code executable by the processor $\mathbf{132}_1$ to cause the RAN node $\mathbf{102}_1$ to perform the steps of the above-described method 800. Note: the other RAN node $\mathbf{102}_2$ may be configured the same as RAN node 102*k*.

Referring to FIG. 10, there is a flowchart of a method 1000 implemented in the wireless device $\mathbf{104}_1$ which is configured to interact with the RAN node $\mathbf{102}_1$ in accordance with an embodiment of the present disclosure. At step 1002, the wireless device $\mathbf{104}_1$ receives from the RAN node $\mathbf{102}_1$ a SI message 200, 400, 604 that includes one or more bits to ensure that the wireless device knows if a cell supports a Mobile Station Assisted Dedicated Core Network Selection. In one embodiment, the SI message 200, 400, 604 is a SI 13 message 200 that includes a SI 13 Rest Octets information element 204 which includes a one bit MS_ASSISTED_DCN field 202 which ensures that the wireless device $\mathbf{104}_1$ knows if the cell supports the Mobile Station Assisted Dedicated Core Network Selection (see discussion above with respect to FIGS. 2-3). In another embodiment, the SI message 200, 400, 604 is an Extended Coverage (EC) SI Type 2 message 400 that includes a one bit MS_ASSISTED_DCN field 202 which ensures that the wireless device 104: knows if the cell supports the Mobile Station Assisted Dedicated Core Network Selection (see discussion above with respect to FIGS. 4-5). In yet another embodiment, the SI message 200, 400, 604 is a SI type 3 message 604 that includes a Control Channel Description information element 602 which includes one bit 606 used to ensure that the wireless device $\mathbf{104}_1$ knows if the cell supports the Mobile Station Assisted Dedicated Core Network Selection (see discussion above with respect to FIGS. 6-7). At step 1004, the wireless device $\mathbf{104}_1$ in response to the reception of the SI message 200, 400, 604 transmits to the RAN node $\mathbf{102}_1$ one or more RLC/MAC radio blocks 150 that match a capability of the RAN node $\mathbf{102}_1$.

Figure 11:
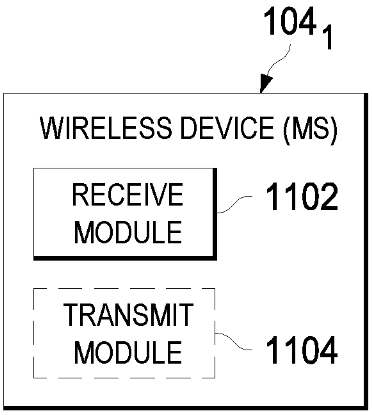

Referring to FIG. 11, there is a block diagram illustrating structures of an exemplary wireless device $\mathbf{104}_1$ configured in accordance with an embodiment of the present disclosure. In one embodiment, the wireless device $\mathbf{104}_1$ comprises a receive module 1102 and a transmit module 1104. The receive module $\mathbf{110}_2$ is configured to receive from the RAN node $\mathbf{102}_1$ a SI message 200, 400, 604 that includes one or more bits to ensure that the wireless device knows if a cell supports a Mobile Station Assisted Dedicated Core Network Selection. In one embodiment, the SI message 200, 400, 604 is a SI 13 message 200 that includes a SI 13 Rest Octets information element 204 which includes a one bit MS_ASSISTED_DCN field 202 which ensures that the wireless device $\mathbf{104}_1$ knows if the cell supports the Mobile Station Assisted Dedicated Core Network Selection (see discussion above with respect to FIGS. 2-3). In another embodiment, the SI message 200, 400, 604 is an Extended Coverage (EC) SI Type 2 message 400 that includes a one bit MS_ASSISTED_DCN field 202 which ensures that the wireless device $\mathbf{104}_1$ knows if the cell supports the Mobile Station Assisted Dedicated Core Network Selection (see discussion above with respect to FIGS. 4-5). In yet another embodiment, the SI message 200, 400, 604 is a SI type 3 message 604 that includes a Control Channel Description information element 602 which includes one bit 606 used to ensure that the wireless device $\mathbf{104}_1$ knows if the cell supports the Mobile Station Assisted Dedicated Core Network Selection (see discussion above with respect to FIGS. 6-7). The transmit module 1104 is configured to transmit to the RAN node $\mathbf{102}_1$ one or more RLC/MAC radio blocks 150 that match a capability of the RAN node $\mathbf{102}_1$. In addition, it should be noted that the wireless device $\mathbf{104}_1$ may also include other components, modules or structures which are well-known, but for clarity, only the components, modules or structures needed to describe the features of the present disclosure are described herein.

As those skilled in the art will appreciate, the above-described modules 1102 and 1104 of the wireless device $\mathbf{104}_1$ may be implemented as suitable dedicated circuit. Further, the modules 1102 and 1104 can also be implemented using any number of dedicated circuits through functional combination or separation. In some embodiments, the modules 1102 and 1104 may be even combined in a single application specific integrated circuit (ASIC). As an alternative software-based implementation, the wireless device $104_1$ may comprise a memory $120_1$, a processor $118_1$ (including but not limited to a microprocessor, a microcontroller or a Digital Signal Processor (DSP), etc.) and a transceiver $101_1$. The memory $120_1$ stores machine-readable program code executable by the processor $118_1$ to cause the wireless device $104_1$ to perform the step of the above-described method 1000. Note: the other wireless devices $104_2$, $104_3$ . . . $104_k$ may be configured the same as wireless device $104_1$.

In view of the foregoing, it should be appreciated that embodiments described herein are illustrated by exemplary embodiments. It should also be appreciated that these embodiments are not mutually exclusive. That is, the components from one embodiment may be tacitly assumed to be present in another embodiment and it will be obvious to a person skilled in the art how those components may be used in the other exemplary embodiments.

Further, the embodiments described herein have been mainly exemplified with GSM/EDGE as the communications network 100 but generally they are applicable to other existing communications networks such as Narrow Band Internet of Things (NB-IoT) and enhanced Machine Type Communication (eMTC) or even to future networks such as 5G and next radio. The radio access node $102_1$, $102_2$ has been exemplified with a BSS $102_1$, $102_2$, but generally it may be another radio access node serving the communication Evolved Node B (eNb) as well. For example for eMTC and NB-IoT the applicable radio access node $102_1$, $102_2$ may also be an eNb. The communication (wireless) device $104_1$, $104_2$, $104_3$ . . . $104_4$ has been exemplified as a wireless device $104_1$, $104_2$, $104_3$ . . . $104_4$, sometimes also referred to as the device.

It should furthermore be noted that, to anyone skilled in the art, there are several realizations of the embodiments described herein with principally equivalent functionality where e.g. introduced fields may be longer or shorter or coded in a different way. An objective of the embodiments herein is to introduce procedures and the corresponding necessary modified or new messages/information elements/fields to ensure that a wireless device $104_1$, $104_2$, $104_3$ . . . $104_4$ that supports UE/MS Assisted Dedicated Core Network selection, can detect whether or not a cell also supports UE/MS Assisted Dedicated Core Network selection.

In addition, it should be noted that the various message names, parameters, information elements and field names may change during the course of the specification work which implies that embodiments described herein would still apply as long as the principal function/use is the same.

Those skilled in the art will appreciate that the use of the term "exemplary" is used herein to mean "illustrative," or "serving as an example," and is not intended to imply that a particular embodiment is preferred over another or that a particular feature is essential. Likewise, the terms "first" and "second," and similar terms, are used simply to distinguish one particular instance of an item or feature from another, and do not indicate a particular order or arrangement, unless the context clearly indicates otherwise. Further, the term "step," as used herein, is meant to be synonymous with "operation" or "action." Any description herein of a sequence of steps does not imply that these operations must be carried out in a particular order, or even that these operations are carried out in any order at all, unless the context or the details of the described operation clearly indicates otherwise.

Of course, the present disclosure may be carried out in other specific ways than those herein set forth without departing from the scope and essential characteristics of the invention. One or more of the specific processes discussed above may be carried out in a cellular phone or other communications transceiver comprising one or more appropriately configured processing circuits, which may in some embodiments be embodied in one or more application-specific integrated circuits (ASICs). In some embodiments, these processing circuits may comprise one or more microprocessors, microcontrollers, and/or digital signal processors programmed with appropriate software and/or firmware to carry out one or more of the operations described above, or variants thereof. In some embodiments, these processing circuits may comprise customized hardware to carry out one or more of the functions described above. The present embodiments are, therefore, to be considered in all respects as illustrative and not restrictive.

Although multiple embodiments of the present disclosure have been illustrated in the accompanying Drawings and described in the foregoing Detailed Description, it should be understood that the invention is not limited to the disclosed embodiments, but instead is also capable of numerous rearrangements, modifications and substitutions without departing from the present disclosure that has been set forth and defined within the following claims.

The invention claimed is:

1. A Radio Access Network (RAN) node configured to interact with a wireless device, the RAN node comprising:

a transceiver circuit;

a processor; and, a memory that stores processor-executable instructions, wherein the processor interfaces with the memory to execute the processor-executable instructions to control the transceiver circuit to:

transmit, to the wireless device, a system information (SI) message that includes one or more bits to ensure that the wireless device knows if a cell supports a Mobile Station Assisted Dedicated Core Network Selection, wherein the SI message is a SI 13 message that includes a SI 13 Rest Octets information element which includes a one bit MS_ASSISTED_DCN field which ensures that the wireless device knows if the cell supports the Mobile Station Assisted Dedicated Core Network Selection.

2. The RAN node of claim 1, wherein the processor further interfaces with the memory to execute the processor-executable instructions to control the transceiver circuit to:

in response to the transmission of the SI message, receive from the wireless device one or more Radio Link Control (RLC)/Media Access Control (MAC) radio blocks that match a capability of the RAN node.

3. A Radio Access Network (RAN) node configured to interact with a wireless device, the RAN node comprising:

a transceiver circuit;

a processor; and, a memory that stores processor-executable instructions, wherein the processor interfaces with the memory to execute the processor-executable instructions to control the transceiver circuit to:

transmit, to the wireless device, a system information (SI) message that includes one or more bits to ensure that the wireless device knows if a cell supports a Mobile Station Assisted Dedicated Core Network Selection, wherein the SI message is an Extended Coverage (EC) SI Type 2 message that includes a one bit MS_ASSISTED_DCN field which ensures that the wireless device knows if the cell supports the Mobile Station Assisted Dedicated Core Network Selection.

4. A method in a Radio Access Network (RAN) node configured to interact with a wireless device, the method comprising:

transmitting, to the wireless device, a system information (SI) message that includes one or more bits to ensure that the wireless device knows if a cell supports a Mobile Station Assisted Dedicated Core Network Selection, wherein the SI message is a SI 13 message that includes a SI 13 Rest Octets information element which includes a one bit MS_ASSISTED_DCN field which ensures that the wireless device knows if the cell supports the Mobile Station Assisted Dedicated Core Network Selection.

5. The method of claim 4, further comprising:

in response to the transmission of the SI message, receiving from the wireless device one or more Radio Link Control (RLC)/Media Access Control (MAC) radio blocks that match a capability of the RAN node.

6. A method in a Radio Access Network (RAN) node configured to interact with a wireless device, the method comprising:

transmitting, to the wireless device, a system information (SI) message that includes one or more bits to ensure that the wireless device knows if a cell supports a Mobile Station Assisted Dedicated Core Network Selection, wherein the SI message is an Extended Coverage (EC) SI Type 2 message that includes a one bit MS_ASSISTED_DCN field which ensures that the wireless device knows if the cell supports the Mobile Station Assisted Dedicated Core Network Selection.

7. A wireless device configured to communicate with a Radio Access Network (RAN) node, the wireless device comprising:

a transceiver circuit;

a processor; and, a memory that stores processor-executable instructions, wherein the processor interfaces with the memory to execute the processor-executable instructions to control the transceiver circuit to:

receive, from the RAN node, a system information (SI) message that includes one or more bits to ensure that the wireless device knows if a cell supports a Mobile Station Assisted Dedicated Core Network Selection, wherein the SI message is a SI 13 message that includes a SI 13 Rest Octets information element which includes a one bit MS_ASSISTED_DCN field which ensures that the wireless device knows if the cell supports the Mobile Station Assisted Dedicated Core Network Selection.

8. The wireless device of claim 7, wherein the processor further interfaces with the memory to execute the processor-executable instructions to control the transceiver circuit to:

in response to receipt of the SI message, transmit to the RAN node one or more Radio Link Control (RLC)/Media Access Control (MAC) radio blocks that match a capability of the RAN node.

9. A wireless device configured to communicate with a Radio Access Network (RAN) node, the wireless device comprising:

a transceiver circuit;

a processor; and, a memory that stores processor-executable instructions, wherein the processor interfaces with the memory to execute the processor-executable instructions to control the transceiver circuit to:

receive, from the RAN node, a system information (SI) message that includes one or more bits to ensure that the wireless device knows if a cell supports a Mobile Station Assisted Dedicated Core Network Selection, wherein the SI message is an Extended Coverage (EC) SI Type 2 message that includes a one bit MS_ASSISTED_DCN field which ensures that the wireless device knows if the cell supports the Mobile Station Assisted Dedicated Core Network Selection.

10. A method in a wireless device configured to communicate with a Radio Access Network (RAN) node, the method comprising:

receiving, from the RAN node, a system information (SI) message that includes one or more bits to ensure that the wireless device knows if a cell supports a Mobile Station Assisted Dedicated Core Network Selection, wherein the SI message is a SI 13 message that includes a SI 13 Rest Octets information element which includes a one bit MS_ASSISTED_DCN field which ensures that the wireless device knows if the cell supports the Mobile Station Assisted Dedicated Core Network Selection.

11. The method of claim 10, further comprising:

in response to receipt of the SI message, transmitting to the RAN node one or more Radio Link Control (RLC)/Media Access Control (MAC) radio blocks that match a capability of the RAN node.

12. A method in a wireless device configured to communicate with a Radio Access Network (RAN) node, the method comprising:

receiving, from the RAN node, a system information (SI) message that includes one or more bits to ensure that the wireless device knows if a cell supports a Mobile Station Assisted Dedicated Core Network Selection, wherein the SI message is an Extended Coverage (EC) SI Type 2 message that includes a one bit MS_ASSISTED_DCN field which ensures that the wireless device knows if the cell supports the Mobile Station Assisted Dedicated Core Network Selection.

* * * * *